No. 790,093. PATENTED MAY 16, 1905.
H. C. WIEDEMAN.
PACKING GASKET.
APPLICATION FILED AUG. 24, 1904.

BEST AVAILABLE COPY

WITNESSES.
J. Y. Mossey
May E. Kott

INVENTOR.
Henry C. Wiedeman
by Parker & Burton ATTORNEYS

No. 790,093. Patented May 16, 1905.

UNITED STATES PATENT OFFICE.

HENRY C. WIEDEMAN, OF DETROIT, MICHIGAN.

PACKING-GASKET.

SPECIFICATION forming part of Letters Patent No. 790,093, dated May 16, 1905.

Application filed August 24, 1904. Serial No. 221,932.

*To all whom it may concern:*

Be it known that I, HENRY C. WIEDEMAN, a citizen of the United States, residing at Detroit, county of Wayne, State of Michigan, have invented a certain new and useful Improvement in Packing-Gaskets; and I declare the following to be a full, clear, and exact description of the invention, such as will enable others skilled in the art to which it pertains to make and use the same, reference being had to the accompanying drawings, which form a part of this specification.

This invention relates to packing-gaskets.

It has for its object an improved packing-gasket or strip intended to be used to pack or calk or pack and calk the joints and seams of tanks that are made by bolting or riveting together flanged rings. Such tanks are made of large diameter and of comparatively heavy metal and are frequently enameled on the interior. The adjacent faces of the flanges or rings used to produce such a tank are not sufficiently true to make a perfectly liquid-tight joint without the interposition of a gasket or some kind of packing, and at the corners between the flange and the body of the ring there is a curved surface, which in the completed tank forms a groove that is liable to gather dirt and impurities and which cannot be closed by ordinary packing; and the object of this invention is to produce a gasket which has means to fill this seam or groove with a metal filling that may be, if necessary, forced into close contact with the surfaces of the rings with calking-tools.

Figure 1:
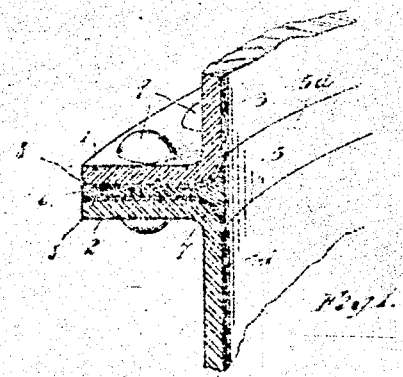
Figure 2:
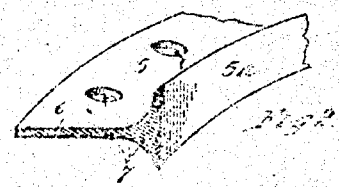

In the drawings, Figure 1 is a cross-section showing the flanges and a portion of the body of two adjacent rings and a cross-section of the packing-gasket interposed between them. Fig. 2 is a perspective showing a short piece of the gasket.

A gasket of size sufficient for use with the rings of an ordinary tank might be from fifteen to thirty feet long, as these tanks are sometimes made even larger than ten feet in diameter. Preferably the gasket is made from block-tin, that metal being chosen because of the use to which the tanks are frequently put; but any comparatively soft metal may be employed to advantage, the character of the metal chosen depending upon the character of use to which the tank is to be put.

1 and 2 indicate the adjacent flanges of two rings 3 and 4.

5 indicates the gasket, which is constructed with a thin tabular part 6, having a breadth substantially equal to that of the flanges of the rings to be joined. At that edge of the tabular part which lies to the interior of the completed structure is a thickened part 7 or ribbed part symmetrical to each surface of the tabular part. The thickened part 7 joins the tabular part 6 with curved surfaces which correspond substantially to the curved surfaces between the flange 1 and the body 3 of the ring. Preferably a thin strip 8 of textile or other suitable packing is laid above and below or at each side of the tabular part 6 and between the gasket 5 and the flanges, and the flanges, with the interposed packing-gaskets, are secured together by bolts or rivets 9. After securing the parts together the face 5ª may, if desired, be treated with a calking-tool to further spread the head-like part of the gasket 5, and after calking it may, if desired, be trimmed, although this is rarely necessary.

What I claim is—

1. A packing-gasket for tanks, having a tabular part to engage between the flanging lips of adjacent rings and a thickened part forming one end thereof and extending at right angles to said tabular part, to engage in the groove formed by the curved corners between the body and the flanges, substantially as described.

2. The combination of a strip of soft metal provided with a tabular part to engage between flanges and a thickened part intersecting one end of said tabular part at right angles, to fill the groove formed at the turn of the flanges, and strips of textile material, substantially as described.

3. A packing-gasket for tanks, consisting of a strip of soft metal of two branches, one intersecting and crossing the end of the other at right angles thereto, one of said branches being adapted to engage between flanges and the other to engage in the groove formed by the curved corners of the flanges, substantially as described.

In testimony whereof I sign this specification in the presence of two witnesses.

HENRY C. WIEDEMAN.

Witnesses:
CHARLES F. BURTON,
MAY E. KOTT.